United States Patent [19]

Ogino

[11] Patent Number: 5,461,220
[45] Date of Patent: Oct. 24, 1995

[54] METHOD OF INHIBITING INFORMATION RECORDING ON SPECIFIC REGION OF RECORDING MEDIUM OR INFORMATION REPRODUCTION THEREFROM AND INFORMATION PROCESSING SYSTEM THEREFOR

[75] Inventor: Yasuo Ogino, Yokohama, Japan

[73] Assignee: Canon Kabushiki Kaisha, Tokyo, Japan

[21] Appl. No.: 75,840

[22] Filed: Jun. 14, 1993

[30] Foreign Application Priority Data

Jun. 17, 1992 [JP] Japan .................... 4-181530

[51] Int. Cl.⁶ .............................. G06K 7/10; G11B 19/04
[52] U.S. Cl. ........................ 235/454; 360/60; 369/59; 380/4
[58] Field of Search ............................... 360/60; 369/59; 235/454; 380/4, 3

[56] References Cited

U.S. PATENT DOCUMENTS

| | | | |
|---|---|---|---|
| 4,677,604 | 6/1987 | Selby, III et al. | 235/462 |
| 4,879,704 | 11/1989 | Takagi et al. | 360/60 |
| 4,891,504 | 1/1990 | Gupta | 360/60 |
| 4,960,982 | 10/1990 | Takahira | 235/382 |
| 5,056,009 | 10/1991 | Mizuta | 364/200 |
| 5,113,061 | 5/1992 | Tanaka | 235/454 |
| 5,138,598 | 8/1992 | Sako et al. | 235/454 |

FOREIGN PATENT DOCUMENTS

| | | |
|---|---|---|
| 0501508 | 9/1992 | European Pat. Off. . |
| 0533204 | 3/1993 | European Pat. Off. . |
| 55784 | 3/1988 | Japan . |
| 136296 | 6/1988 | Japan . |
| 1237782 | 9/1989 | Japan . |
| 235187 | 9/1990 | Japan ............................. 235/462 |
| 3122713 | 5/1991 | Japan . |
| 3147193 | 6/1991 | Japan . |

*Primary Examiner*—John Shepperd
*Attorney, Agent, or Firm*—Fitzpatrick, Cella, Harper & Scinto

[57] ABSTRACT

A signal for designating a portion of information regions of a recording medium is sent from an external apparatus to an information processing apparatus so as to cause the information processing apparatus to record information on the designated portion of the information regions or to reproduce information from the designated portion of the information regions. The information regions of the recording medium consist of a specific region and a remaining region. It is determined whether the designated portion of the information regions falls within the specific region or the remaining region. When the designated portion of the information regions is determined to fall within the specific region, the recording of information is interrupted or the reproduction of information is interrupted.

14 Claims, 7 Drawing Sheets

METHOD OF INHIBITING INFORMATION RECORDING ON SPECIFIC REGION OF RECORDING MEDIUM OR INFORMATION REPRODUCTION THEREFROM AND INFORMATION PROCESSING SYSTEM THEREFOR

BACKGROUND OF THE INVENTION

1. Field of the Invention

The present invention relates to a method of inhibiting information recording on a specific region of a recording medium or information reproduction therefrom and an information processing system therefor.

2. Related Background Art

Known conventional information recording media for recording medium individual information are an optical card using an additional storage type recording medium, disclosed in Japanese Laid-Open Patent Application No. 63-55784 and an IC card disclosed in Japanese Laid-Open Patent Application No. 63-136296. Magnetic cards popularly used as banking cards are also exemplified as the above information recording media. To guarantee personal privacy and prevent illegal modifications, several methods are proposed in these cards for recording medium individual information. For example, the following method is known as a method of preventing the illegal modifications of an optical card. To record information on the optical card, a laser beam is focused and radiated on the recording medium to form pits corresponding to the recording information. In a reproduction mode, a read laser beam scans a pit array to read the presence/absence of a pit as a change in intensity of reflected light.

When security of an optical card is taken into consideration on the basis of the above recording/reproducing principle, the pit array recorded on the optical card can be observed with a microscope or the like. For this reason, the recorded information may be read, but must be prevented from being decoded. For this purpose, a method of converting original data to be recorded into another data using, e.g., an "8–10 conversion table" to record the converted data on the optical card is available. A method of rearranging original data in error correction can also be used together with the above method. The above data processing is performed inside an optical card recording/reproducing apparatus. However, similar data conversion processing and data rearrangement processing can be performed in an external apparatus installed with application software.

A function of copying information recorded in an optical card between two optical card recording/reproducing apparatuses is also available. This copy function is utilized when the memory capacity of an external apparatus is smaller than that of an optical card or when a back-up optical card is formed to improve operating efficiency of an external apparatus due to the absence of the external apparatus during the copy operation. The above copy function is started by a copy command transmitted from the external apparatus to the optical card recording/reproducing apparatus, and then data is exchanged between the first optical card recording/reproducing apparatus as a data transmission source mounted with an optical card recorded with original data and the second optical card recording/reproducing apparatus mounted with a blank optical card, thereby executing a copy operation.

In recent years, standardization of optical cards has been discussed. With this trend, optical card recording/reproducing apparatuses are expected to be standardized in the near future. When this standardization is put into practice, recording/reproducing formats are disclosed to the public. Under such circumstances, none of the conventional prevention methods are effective except the method using passwords. Otherwise, the guarantee of privacy and prevention of illegal modifications must rely on countermeasures in the external apparatus installed with application software. When a password is not recorded, or when medium individual information is recorded in the manufacture of an optical card and a password and an ID number are recorded after this optical card is issued to a person, this may invite an illegal operation of copying the optical card before it is issued to the person. If the copy function is illegally used in the optical card recording/reproducing apparatus having this copy function, an optical card can be easily and illegally copied, resulting in inconvenience.

SUMMARY OF THE INVENTION

It is an object of the present invention to provide a method of solving the conventional problems described above and properly preventing illegal copying of confidential information recorded on a recording medium, and an information processing system therefor.

In order to achieve the above object according to the first aspect of the present invention, there is provided a method of recording information on a recording medium having information regions consisting of a specific region and a remaining region or reproducing the information therefrom, using an information processing apparatus and an external apparatus connected to the information processing apparatus, comprising the steps of:

sending a signal for designating a portion of the information regions of the recording medium from the external apparatus to the information processing apparatus;

determining by the information processing apparatus whether the designated portion of the information regions falls within the specific or remaining region;

inhibiting information recording or reproduction when the designated portion of the information regions is determined to fall within the specific region; and recording the information in the designated portion of the information regions or reproducting the information therefrom by the information processing apparatus when the designated portion of the information regions is determined to fall within the remaining region.

In order to achieve the above object according to the first aspect of the present invention, there is provided an information processing system, comprising:

an information processing apparatus for recording information on a recording medium having information regions consisting of a specific region and a remaining region or reproducing the information therefrom;

an external apparatus, connected to the information processing apparatus, for sending a signal for designating a portion of the information regions of the recording medium; and control means for determining whether the portion of the information regions which is designated by the signal sent from the external apparatus falls within the specific or remaining region, for inhibiting information recording or reproduction if the designated portion of the information regions is determined to fall within the specific region, and for causing the information processing apparatus to record the information on the designated portion of the information regions or reproduce the information therefrom if the designated portion of the information regions is determined to fall within the remaining region.

In order to achieve the above object according to the second aspect of the present invention, there is provided a method of copying information recorded on a first recording medium to a second recording medium, using a first information processing apparatus for reproducing information from the first recording medium having information regions consisting of a specific region and a remaining region, a second information processing apparatus, connected to the first information processing apparatus for recording the information reproduced by the first information processing apparatus on the second recording medium, and an external apparatus connected to the first and second information processing apparatuses, comprising the steps of:

sending a signal for designating a portion of the information regions of the first recording medium from the external apparatus to the first information processing apparatus;

determining by the first information processing apparatus whether the designated portion of the information regions falls within the specific or remaining region;

inhibiting a copy operation of the information from the first recording medium to the second recording medium if the designated portion of the information regions is determined to fall within the specific region; and causing the first information processing apparatus to reproduce the information recorded in the designated portion of the information regions and causing the second information processing apparatus to record the reproduced information on the second recording medium if the designated portion of the information regions is determined to fall within the remaining region.

In order to achieve the above object according to the second aspect of the present invention, there is provided an information processing system comprising:

a first information processing apparatus for reproducing information from a first recording medium having information regions consisting of a specific region and a remaining region;

a second information processing apparatus, connected to the first information processing apparatus, for recording the information reproduced by the first information processing apparatus on a second recording medium;

an external apparatus, connected to the first and second information processing apparatuses, for sending a signal for designating a portion of the information regions of the first recording medium to the first information processing apparatus; and control means for determining whether the portion of the information regions which is designated by the signal sent from the external apparatus falls within the specific or remaining region, for inhibiting information reproduction from the first recording medium if the designated portion of the information regions is determined to fall within the specific region, and for causing the first information processing apparatus to reproduce the information recorded on the designated portion of the information regions if the designated portion of the information regions is determined to fall within the remaining region.

DETAILED DESCRIPTION OF THE PREFERRED EMBODIMENTS

Figure 1:
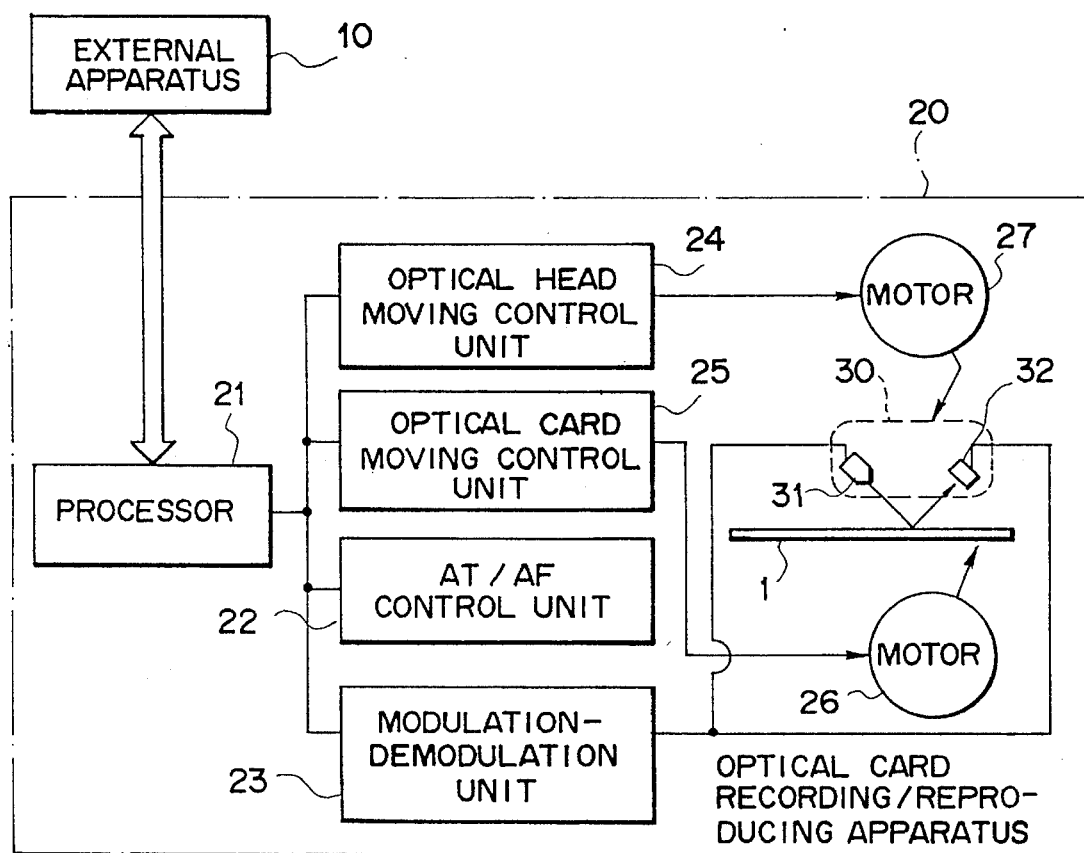
FIG. 1 is a schematic diagram showing an information processing system according to the first embodiment of the present invention.

Preferred embodiments of the present invention will be described in detail with reference to the accompanying drawings. FIG. 1 is a block diagram of an information processing apparatus according to an embodiment of the present invention. This embodiment exemplifies an optical card recording/reproducing apparatus using an optical card as an information recording medium. Referring to FIG. 1, an external apparatus 10 serves as a host control apparatus such as a personal computer. An optical card recording/reproducing apparatus 20 is connected to the external apparatus 10. The external apparatus 10 issues a recording or reproducing instruction to the optical card recording/reproducing apparatus 20 and executes recording/reproducing processing on the basis of the instruction from the external apparatus 10. The optical card recording/reproducing apparatus 20 is arranged as follows. A microprocessing unit (processor) 21 systematically controls the apparatus in accordance with a predetermined control program. In addition to control of the respective constituent components, the processor 21 performs communication with the external apparatus 10 and copy prevention of medium individual information of an optical card 1, which will be described in detail later. An AT/AF control unit 22 performs autotracking (AT) control and autofocusing (AF) control by moving a light beam focusing objective lens arranged in a light beam radiation optical system 31 (to be described later) in the tracking and focusing directions. Output signals from the AT/AF control unit 22 are output to two actuators (not shown), respectively. Position control of the objective lens is performed by these actuators. The objective lens is moved in the tracking direction to cross an information track of the optical card 1 and in the focusing direction to focus a light beam as a fine light spot on the surface of the recording medium. Therefore, the light beam is scanned along the information tracks while being focused on the medium surface.

A modulation-demodulation unit 23 modulates a recording signal in accordance with a predetermined modulation scheme or demodulates a reproduced signal. A modulation signal from the modulation-demodulation unit 23 is output to the light beam radiation optical system 31 to intensity-modulate a light beam in accordance with this modulation signal, thereby recording an information pit corresponding to the recording signal on an information track of the optical card 1. In an information reproduction mode, a detection signal from a photodetector 32 is sent to the modulation-demodulation unit 23 to perform predetermined binarization and demodulation, thereby reproducing recorded information. The light beam radiation optical system 31 is constituted by various optical elements such as a semiconductor laser serving as a light source and the above-mentioned objective lens. The light beam radiation optical system 31 is formed integrally with the photodetector 32 to constitute an optical head 30. An optical head moving control unit 24 controls movement of the optical head 30. That is, the optical head moving control unit 24 controls a motor 27 for driving the optical head 30. The optical head 30 is moved in a direction to cross the information tracks and is positioned to a target information track. An optical card moving control unit 25 controls movement of the optical card 1. That is, the optical card moving control unit 25 controls a motor 26 for driving the optical card to reciprocate the optical card 1, thereby scanning an information track of the optical card 1 with a light beam.

Figure 2:
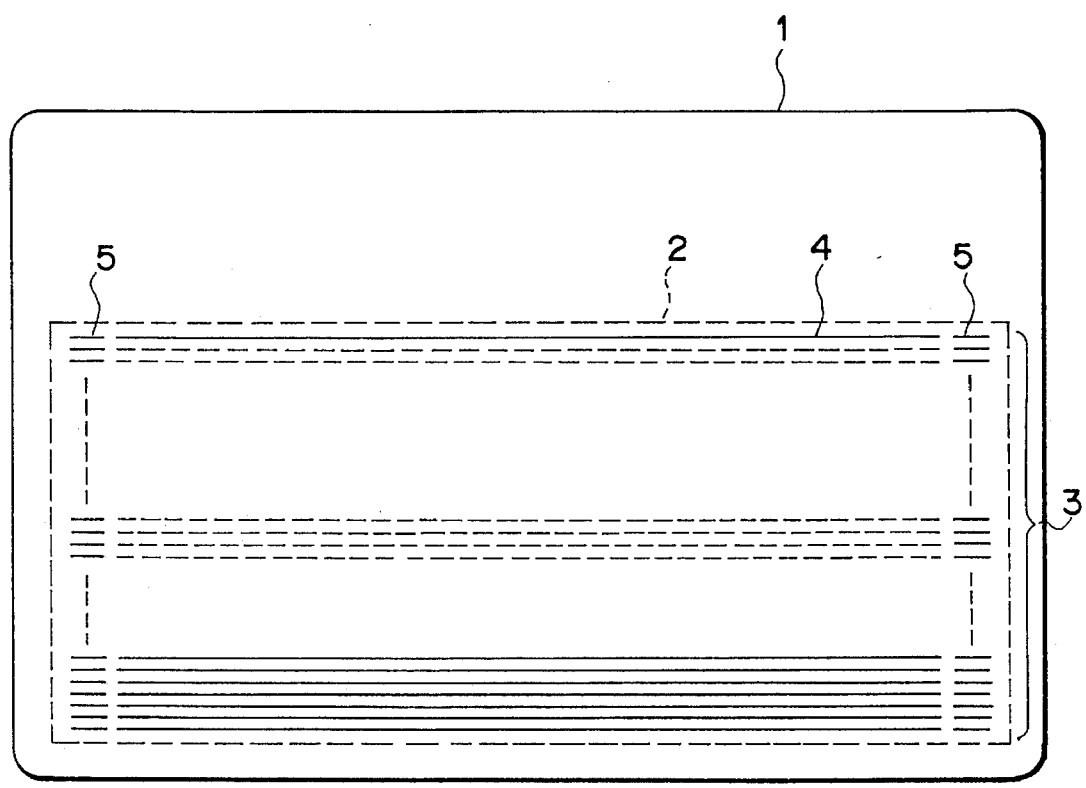
FIG. 2 is a schematic plan view of an optical card used in the system shown in FIG. 1.

FIG. 2 is a view illustrating the recording surface of the optical card 1. The recording surface has an information recording/reproducing area 2 and a large number of information tracks 3 formed in the area 2. The information tracks 3 are aligned parallel to each other at predetermined intervals. Track numbers 5 as the position information of the information tracks are recorded on both sides of the information tracks 3. In this embodiment, medium individual information is recorded on a first information track 4 positioned at the uppermost portion of FIG. 2. This medium individual information is information recorded in a predetermined region during the manufacture of the optical card 1 and includes a card management number for each application, an individual management number of a card holder, a vehicle management number required when an optical card is used in a vehicle such as an automobile, and an apparatus management number. This information is not limited to information associated with numbers, but can be information for identifying each card or each application purpose (e.g., a medical card, a member card, or a banking card). The information tracks 3 represented by solid lines are information tracks on which information has already been recorded, and the information tracks 3 represented by dotted lines are blank information tracks.

This embodiment will be described in more detail. A basic operation of the optical card recording/reproducing apparatus will be described first. When the optical card 1 is inserted into a card inserting opening (not shown) of the optical card 1 recording/reproducing apparatus, the optical card 1 is conveyed in a predetermined position within the apparatus by a convey mechanism (not shown). FIG. 1 shows a state in which the optical card 1 is located at a predetermined position on the lower surface of the optical head 30. When the optical card 1 is located at the predetermined position, the processor 21 instructs reciprocal movement of the optical card 1 to the optical card moving control unit 25. By this instruction, the optical card moving control unit 25 controls the optical card drive motor 26, and the optical card 1 starts reciprocal movement in its longitudinal direction (i.e., a direction of information tracks). The processor 21 sends a tracking control instruction and a focusing control instruction to the AT/AF control unit 22 to start tracking control and focusing control of the light beam emitted from the semiconductor laser in the light beam radiation optical system 31. Therefore, the light beam radiated on the optical card 1 starts to reciprocate and scan the information tracks of the optical card 1 while being set in an in-focus state.

Information is reproduced on the basis of an instruction from the external apparatus 10. To reproduce information, position information (address) such as an information track number subjected to reproduction is transmitted from the external apparatus 10. The processor 21 accesses the optical head 30 to a target track on the basis of this position information. That is, the processor 21 causes the optical head moving control unit 24 to move the optical head 30 in a direction to cross the information tracks, so that the light beam is positioned on the target track. The target information track is scanned with a light beam having a reproducing power radiated from the light beam radiation optical system 31. The light beam is reflected by the recording surface of the optical card 1, and the reflected beam is detected by the photodetector 32. A detection signal from the photodetector 32 is sent as a signal representing a change in amount of the reflected light to the modulation-demodulation unit 23. The modulation-demodulation unit 23 generates a reproduced signal on the basis of the detection signal from the photodetector 32. The reproduced signal is binarized, and the binary signal is demodulated, thereby generating reproduced data. The resultant reproduced data is sent to the processor 21 to check whether an error is present in the reproduced data. The reproduced data is then transferred to the external apparatus 10. If an error is detected in the reproduced data, information is reproduced from the same information track again. On the other hand, in a recording mode, the optical head 30 is moved onto the target track. Recording data is then sent from the processor 21 to the modulation-demodulation unit 23. The recording data is subjected to predetermined modulation such as MFM modulation. The modulated data is sent to a laser control unit (not shown), and the light beam from the semiconductor laser is intensity-modulated with the modulated data. The intensity-modulated light beam scans an information track to record a series of information as a pit array on the information track.

Figure 3:
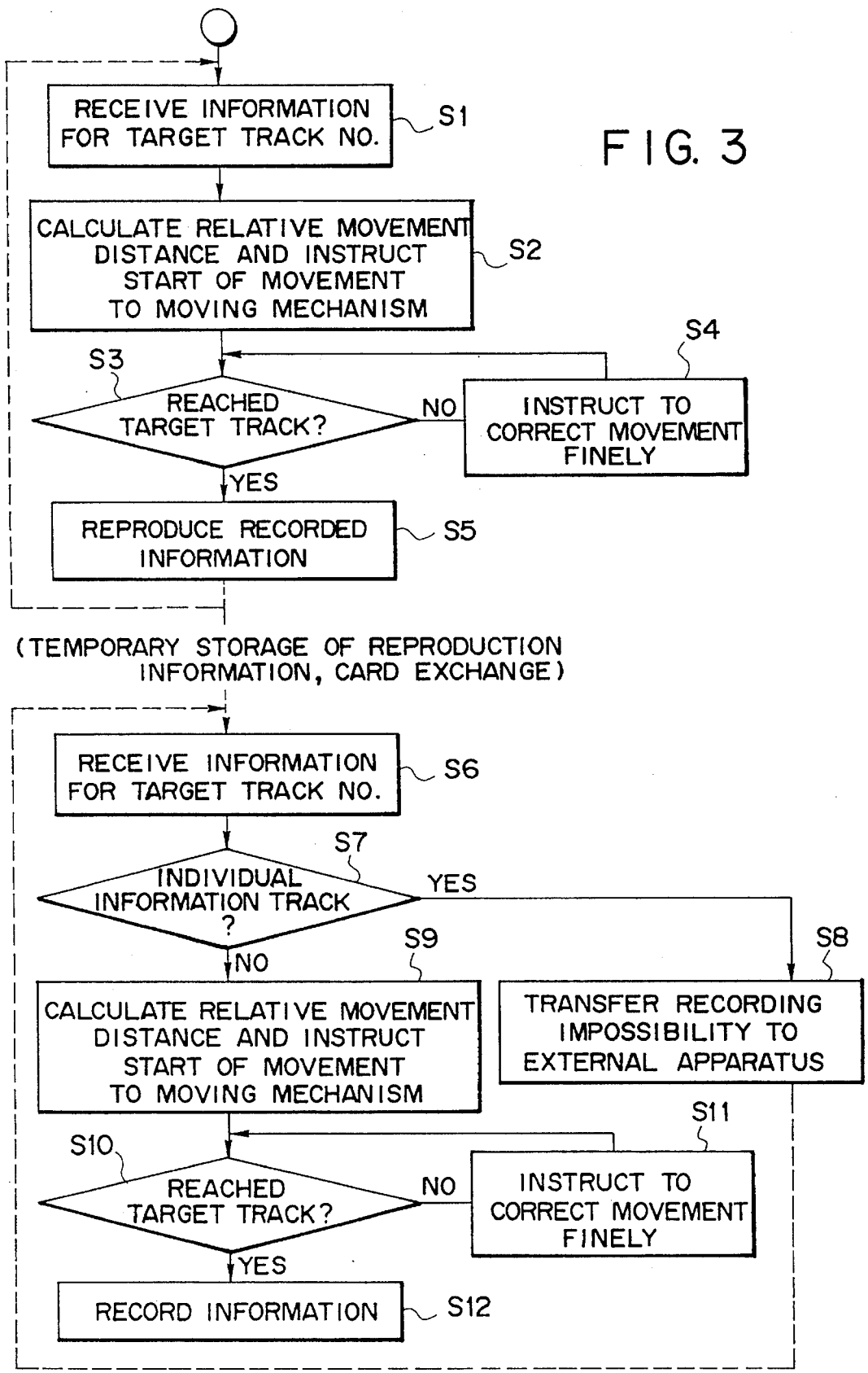
FIG. 3 is a flow chart for explaining a method of recording information using the system in FIG. 1 according to the present invention.

The basic operations of the optical card recording/reproducing apparatus 20 have been described above. An information copy prevention operation of the optical card information recording/reproducing apparatus of this embodiment will be described below. More specifically, medium individual information is recorded on a predetermined information track 4 of the optical card 1, as described with reference to FIG. 2, and the copy prevention operation of the optical card recording/reproducing apparatus upon an illegal copy operation will be described with reference to a flow chart in FIG. 3. Assume that the external apparatus 10 accesses the optical card recording/reproducing apparatus of this embodiment, and that a reproducing instruction is issued to the optical card recording/reproducing apparatus. When the reproducing instruction is issued from the external apparatus 10, position information (address) such as a target information track number and a target sector number is transmitted, and such a command is received by the processor 21 through an interface (not shown). When the processor 21 receives the target track number (S1), the processor 21 calculates a relative movement distance from the current position to the target position and sends the moving amount and the moving direction to cause the optical head moving control unit 24 to instruct the start of movement of the optical head 30 to the target position (S2). The optical head moving control unit 24 controls the optical head drive motor 27, and the optical head 30 starts to move toward the target position. The processor 21 reads the track number 5 of the stop position of the optical head 30 to determine whether the optical head 30 has reached the target track (S3). If the stop position is different from the position of the target track, the processor 21 instructs the optical head moving control unit 24 to correct movement finely (S4).

The optical head 30 reaches the target track, as described above, and read access of information recorded on the designated target track is started (S5). In this case, a reproduction light beam scans the information track, as previously described, and the information is reproduced from a detection signal from the photodetector 32 which detects the reflected beam. The reproduced data is transferred from the processor 21 to the external apparatus 10. To copy this reproduced data, the optical card is removed from the optical card recording/reproducing apparatus 20, and another or blank optical card is inserted, thus performing copy preparation. When this copy preparation is completed, the external apparatus 10 accesses the optical card recording/reproducing apparatus 20 again to issue a recording instruction. At this time, recording data or a target information track number or a target sector number is transmitted from the external apparatus 10 to the optical card recording/reproducing apparatus 20. Upon reception of the target track number or the target sector number (S6), the processor 21 determines whether the designated information track or sector is a specific information track or a specific sector (in this embodiment, the information track 4 on which medium individual information is recorded, as described with reference to FIG. 2) (S7). This determination operation is executed by the processor 21 itself when an information recording instruction is issued. If the information track or sector number designated by the external apparatus 10 coincides with the information track or sector on which the medium individual information is recorded, the processor 21 stops outputting a moving instruction to the optical head moving control unit 24 and informs the external apparatus 10 of recording impossibility of the transmitted data on the designated information track or the designated sector (S8). To inhibit recording access, the move instruction is not output to the optical head moving control unit 24. However, to inhibit recording access, a drive instruction for the optical head 30 may be prevented from being output from the optical head control unit 24 to the optical head drive motor 27.

When the information track or sector number designated from the external apparatus 10 does not coincide with the information track or sector number at which medium individual information is to be recorded, recording is determined as normal information recording. In this case, the processor 21 sends the moving amount and the moving direction of the optical head 30 to the optical head moving control unit 24 on the basis of the current position and the target position to instruct movement of the optical head (S9). The optical head 30 starts to move toward the target track. When the optical head 30 moves by the designated moving amount, the processor 21 reads the track number 5 of the stop position of the optical head 30 to determine whether the optical head 30 has reached the target track (S10). If a difference between the stop position and the target track is detected, the processor 21 instructs the optical head moving control unit 24 to correct movement finely, thereby moving the light beam on the target track (S11). The light beam is positioned on the target track, as described above, and data sent from the external apparatus 10 is recorded on the target track (S12). When recording on the information track is completed, the flow returns to step S6 to repeat the above operations. The processor 21 compares the next information track or the next sector with the track or sector on which medium individual information is recorded. If so, recording access is inhibited; otherwise, information is recorded. When steps S6 to S12 are repeated to record all data, the processor 21 informs the external apparatus 10 of the end of recording, and processing is ended.

In this embodiment, the information sector or track which is designated from the external apparatus is compared with the information track or sector on which medium individual information is recorded. If a coincidence is established, recording access of this region is inhibited. Even if a third person attempts to illegally copy medium individual information on the optical card, the medium individual information is not recorded, thereby properly preventing the medium individual information from being copied. An optical card will not be illegally copied when a password is not recorded or before the optical card is issued to a person upon the manufacture of the optical card. The reliability associated with security of the optical card can be greatly improved.

Figure 4:
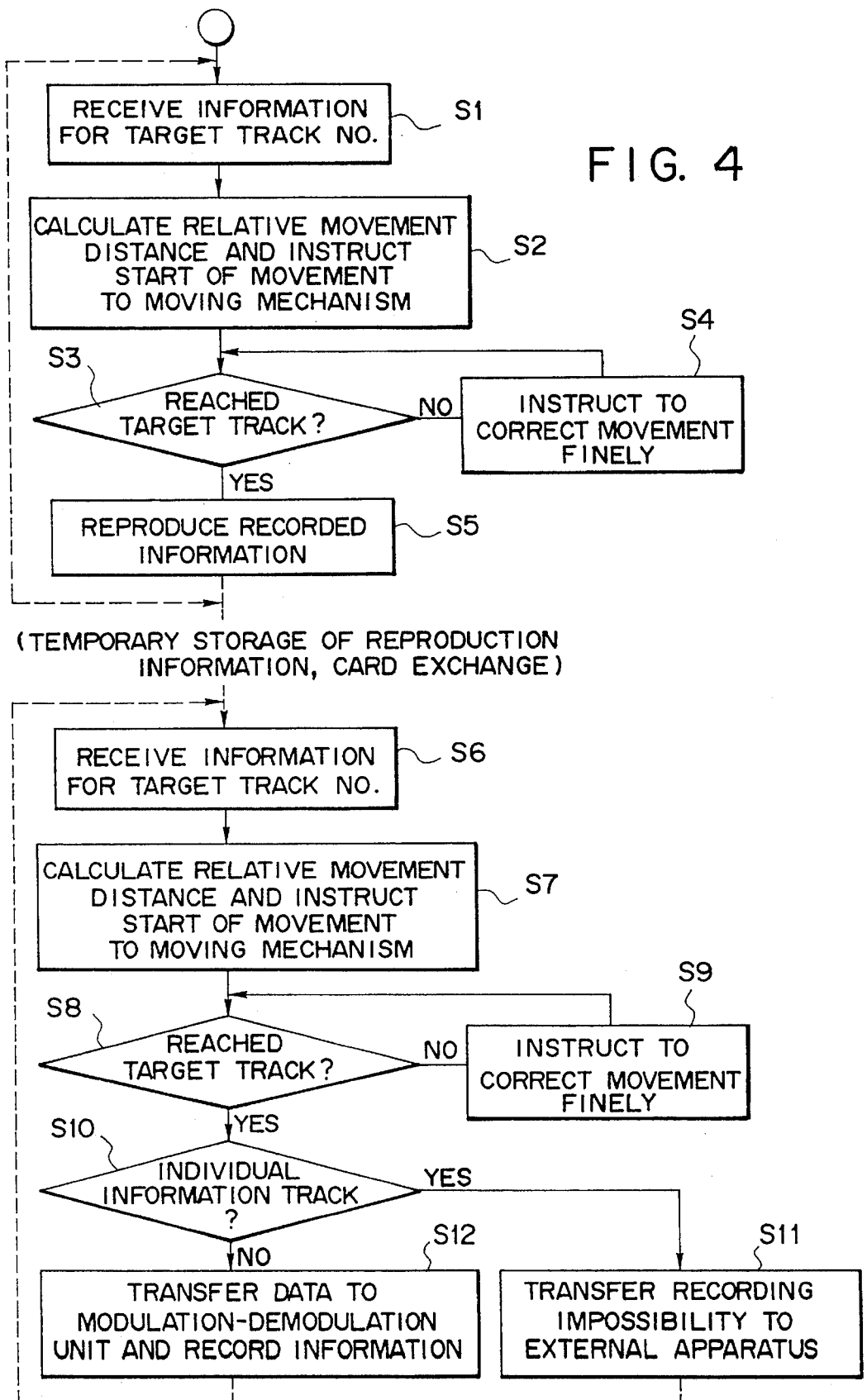
FIG. 4 is a flow chart for explaining another method of recording information using the system in FIG. 1 according to the present invention.

FIG. 4 is a flow chart showing another operation of this embodiment. In this flow chart, when the optical head 30 reaches a target track designated by the external apparatus 10, it is determined whether the designated information track is an information track on which medium individual information is to be recorded. Referring to FIG. 4, information reproduction in steps S1 to S5 is the same as in FIG. 3, and a detailed description thereof will be omitted. Upon information reproduction, when a recording instruction is issued by the external apparatus 10, the processor 21 receives a target track number (S6). The processor 21 calculates a moving amount of the optical head 30 from the current position to the target position and sends the target track number, the moving amount, and the moving direction to the optical head moving control unit 24 to instruct movement of the optical head 30 to the target track (S7). When the optical head 30 is moved by the designated moving amount, the processor 21 reads the track number 5 to determine whether the optical head 30 has reached the target track (S8). If a difference between the target position and the stop position of the optical head 30 is detected, the processor 21 instructs the optical head moving control unit 24 to correct movement finely (S9), thereby positioning the light beam from the optical head 30 on the target track.

The processor 21 determines whether the information track designated by the external apparatus 10, i.e., the target track at which the optical head 30 is currently located coincides with the information track (or sector) on which medium individual information is to be recorded (S10). If YES in step S10, the processor 21 stops transferring data transferred from the external apparatus 10 to the modulation-demodulation unit 23 and informs the external apparatus 10 of recording impossibility of the information on the designated target track (S11). To inhibit the recording operation, the data is not transferred to the modulation-demodulation unit 23. However, any other method may be employed. For example, data is not transferred from the modulation-demodulation unit 23 to a laser control unit, or the output power of the semiconductor laser can be reduced to a reproduction light power. When the information track designated by the external track does not coincide with the information track on which the medium individual information is to be recorded, recording is determined as normal information recording. In this case, the processor 21 transfers recording data to the modulation-demodulation unit 23 to record information on the target track (S12). When steps S6 to S12 are repeated, and all data transferred from the external apparatus 10 are recorded, the processor 21 informs the external apparatus 10 of the end of recording, and processing is ended. In this routine, even if a third person tries to illegally copy the medium individual information on the optical card, recording of the medium individual information from a specific region of the optical card can be prevented, as in the routine in FIG. 3. Therefore, copying of the medium individual information of the specific region can be appropriately prevented.

In the above embodiment, the medium individual information is recorded on one information track. However, this information may be recorded on a plurality of continuous information tracks or sectors or a plurality of discrete information tracks or sectors. In this case, as can be apparent from the flow charts in FIGS. 3 and 4, each information track or sector designated by the external apparatus is compared with the corresponding information track or sector on which the medium individual information is recorded. Even if the medium individual information region is designated by the external apparatus, this region is not accessed for recording.

In the above embodiment, the information track or sector on which information is to be recorded in the recording mode is compared with the information track or sector on which medium individual information is recorded. If a coincidence is established, a recording operation of the corresponding region is inhibited. However, the same operation may be performed in the information reproduction mode. That is, in the information reproduction mode, a target information track or sector is compared with the track or sector on which medium individual information is recorded. If a coincidence is established, a reproduction operation of the corresponding region is inhibited. A means for inhibiting the reproduction operation is a means for inhibiting movement of the optical head to the reproduction position, or a means for inhibiting demodulation of the reproduction information.

Figure 5:
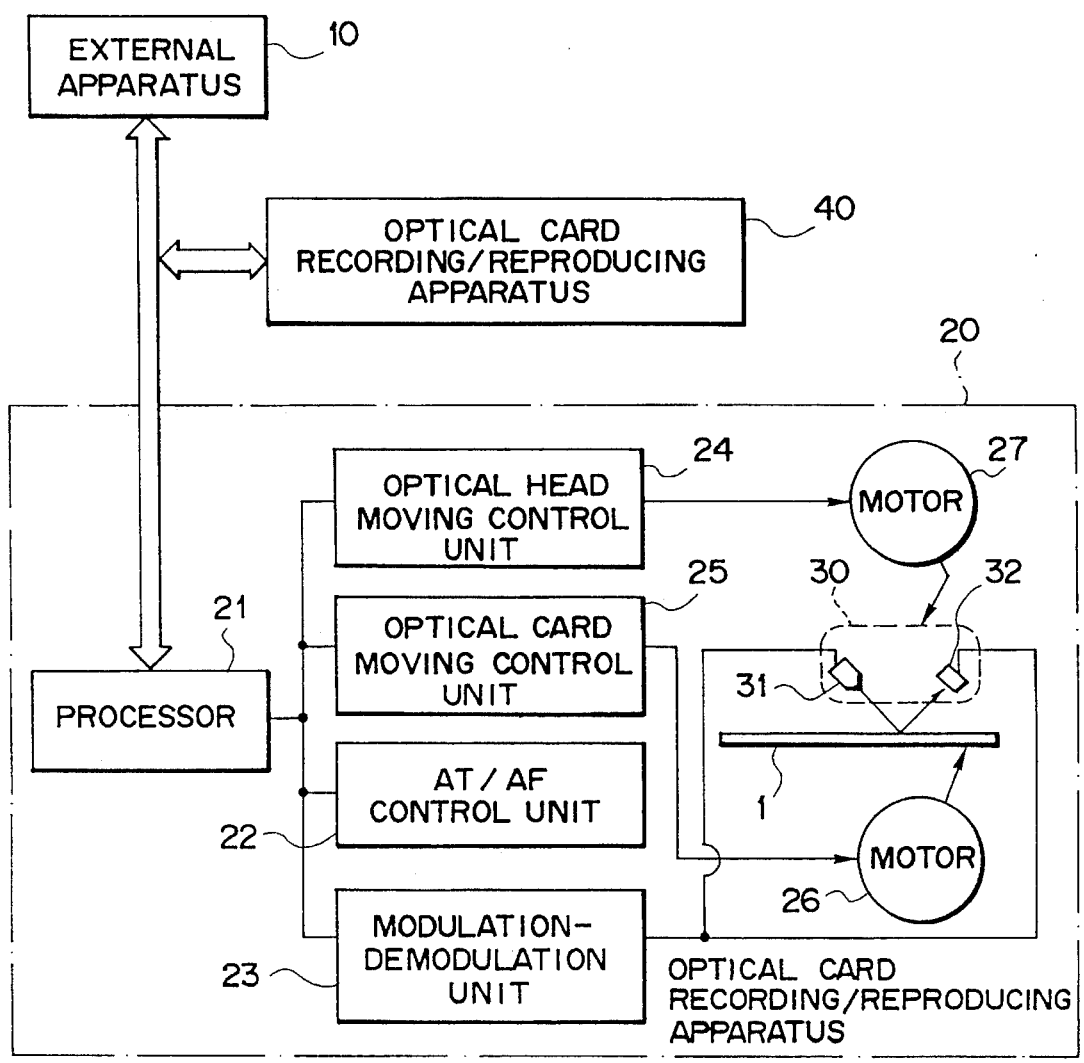
FIG. 5 is a schematic diagram of an information processing system according to the second embodiment of the present invention.

A method of preventing recorded information of an optical card from being copied between two optical card recording/reproducing apparatuses will be described below. FIG. 5 is a block diagram in which optical card recording/reproducing apparatuses 20 and 40 are connected to an external apparatus 10. Each of the optical card recording/reproducing apparatuses 20 and 40 in FIG. 5 is the same as the optical card recording/reproducing apparatus shown in FIG. 1. First of all, a basic operation for performing copying between the two optical card recording/reproducing apparatuses 20 and 40 in FIG. 5 will be described. To copy predetermined information of an optical card 1, a copy command is issued from the external apparatus 10 to the optical card recording/reproducing apparatuses 20 and 40. When this copy command is issued, a data transmitting apparatus and a data receiving apparatus are designated, and position information of a target information track or sector of the optical card 1, from which information is to be copied, is transmitted. In this embodiment, the data transmitting apparatus is defined as the optical card recording/reproducing apparatus 20, and the data receiving apparatus is defined as the optical card recording/reproducing apparatus 40. Under this condition, an optical card recorded with original data to be copied is loaded in the optical card recording/reproducing apparatus 20 serving as the transmitting apparatus, and a blank optical card is loaded in the optical card recording/reproducing apparatus 40 serving as the data receiving apparatus.

When the copy command is issued as described above, information within a range designated on the optical card 1 is reproduced for, e.g., each track, and the reproduced data is transferred to the optical card recording/reproducing apparatus 40 serving as the receiving apparatus. After the optical card recording/reproducing apparatus 40 confirms that the loaded optical card is a new blank optical card, the optical card recording/reproducing apparatus 40 sequentially records the received data for each track. In this case, information reproduction and information recording executed between the two apparatuses are performed for at least each track. Unlike in a normal recording/reproduction operation, information is reproduced in the transmitting apparatus, and at the same time the received data is recorded in the receiving apparatus.

Figure 6:
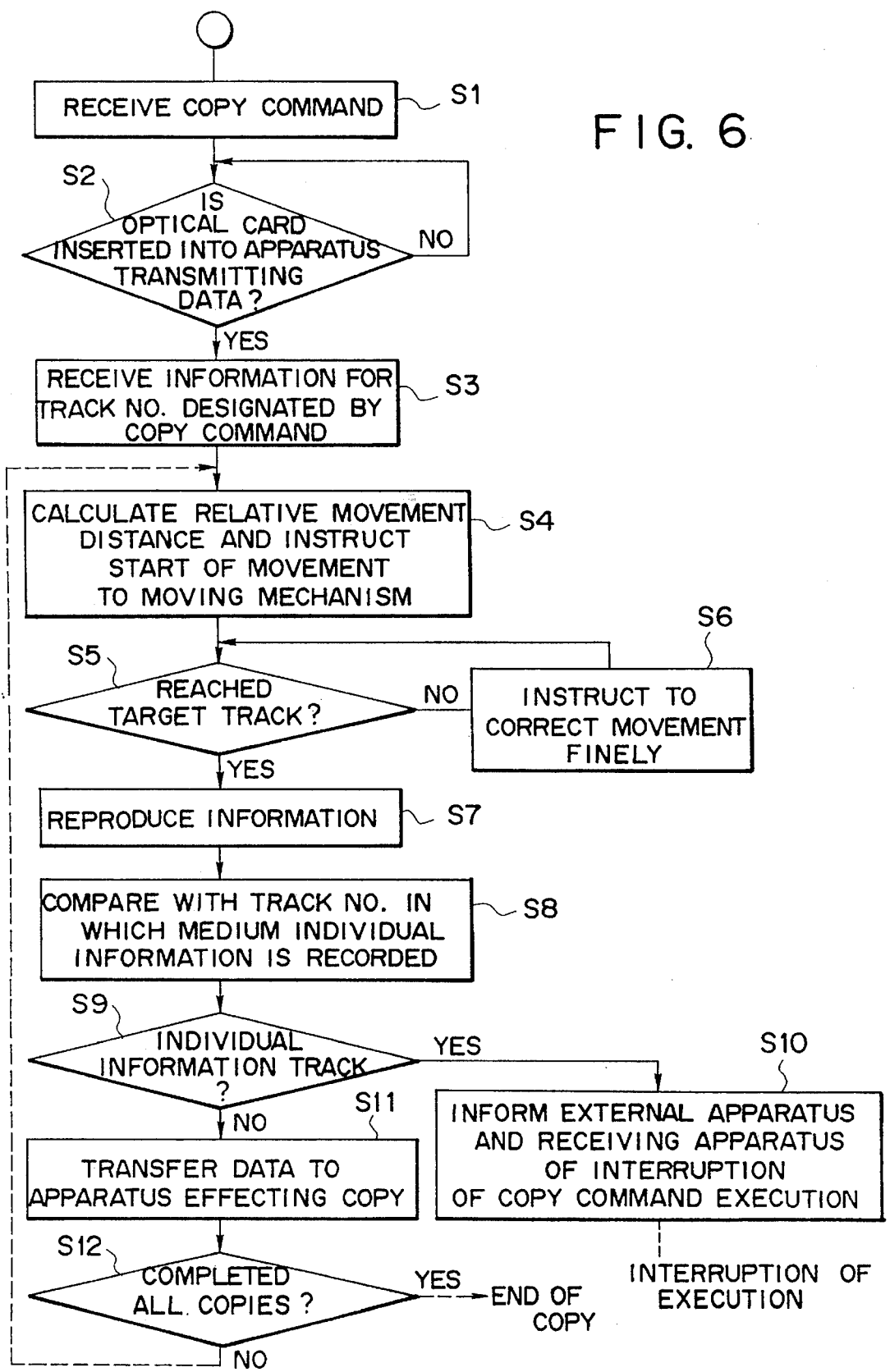
FIG. 6 is a flow chart for explaining a method of copying information using the system in FIG. 5 according to the present invention.

The basic copy operation between the optical card recording/reproducing apparatuses 20 and 40 has been described above. An operation for preventing medium individual information from being copied using a copy function of the optical card recording/reproducing apparatus will be described below. FIG. 6 is a flow chart showing processing for preventing copy of this embodiment. Medium individual information is recorded on an information track 4 of the optical card 1, as described with reference to FIG. 2. FIG. 6 shows processing of the optical card recording/reproducing apparatus 20 serving as the data transmitting apparatus. Referring to FIG. 6, a copy command from the external apparatus 10 is received (S1), and it is determined whether an optical card has been inserted in the data transmitting apparatus (S2). When it is determined that an optical card has been inserted in the data transmitting apparatus, the processor 21 receives position information such as a target information track number and a target sector number from the copy command (S3). The processor 21 calculates a moving amount to the target position on the basis of the position information and the current position of an optical head 30 to cause an optical head moving control unit 24 to instruct movement to the target position (S4). When the optical head 30 is moved by the designated moving amount, the processor 21 determines whether the optical head 30 has reached the target track (S5). If a difference between the target position and the stop position of the optical head 30 is detected, the processor 21 instructs the optical head moving control unit 24 to correct movement finely (S6). The optical head 30 then reaches the target track, and the processor 21 controls the respective constituent components to sequentially reproduce information for, e.g., each track (S7). This reproduced data is temporarily stored in a memory (not shown).

The processor 21 determines whether the information track or section of the reproduced information coincides with the information track or sector on which medium individual information is recorded (S9). If YES in step S9, the processor 21 executes the next processing. That is, the processor 21 inhibits transfer of the reproduced data to the optical card recording/reproducing apparatus 40 serving as the receiving apparatus and informs the receiving apparatus of interruption of the copy command. The processor 21 also informs the external apparatus 10 of copying impossibility or access impossibility (S10). In this case, the data stored in the memory is erased, as a matter of course. If NO in step S9, the processor 21 determines this operation as a normal copy operation. The processor 21 transfers the reproduced data to the optical card recording/reproducing apparatus 40 serving as the receiving apparatus (S11). In the optical card recording/reproducing apparatus 40, the received data is recorded on the designated information track. The flow then returns to step S4 to repeat the above operations. The processor 21 determines whether all designated data are copied (S12). If NO in step S12, steps S4 to S11 are repeated to complete all copies. When all the copies are completed, the processor 21 informs the external apparatus 10 of the end of copy, and a series of information copy operations are completed.

In this embodiment, the information track or sector designated by the external apparatus in the copy mode is compared with the information track or sector on which medium individual information is recorded. The reproduced data is not transferred to a region in which the above two pieces of information coincide. Even if a third person attempts to illegally copy the medium individual information, the medium individual information is not copied to another optical card, and the medium individual information can be properly prevented from being copied.

Figure 7:
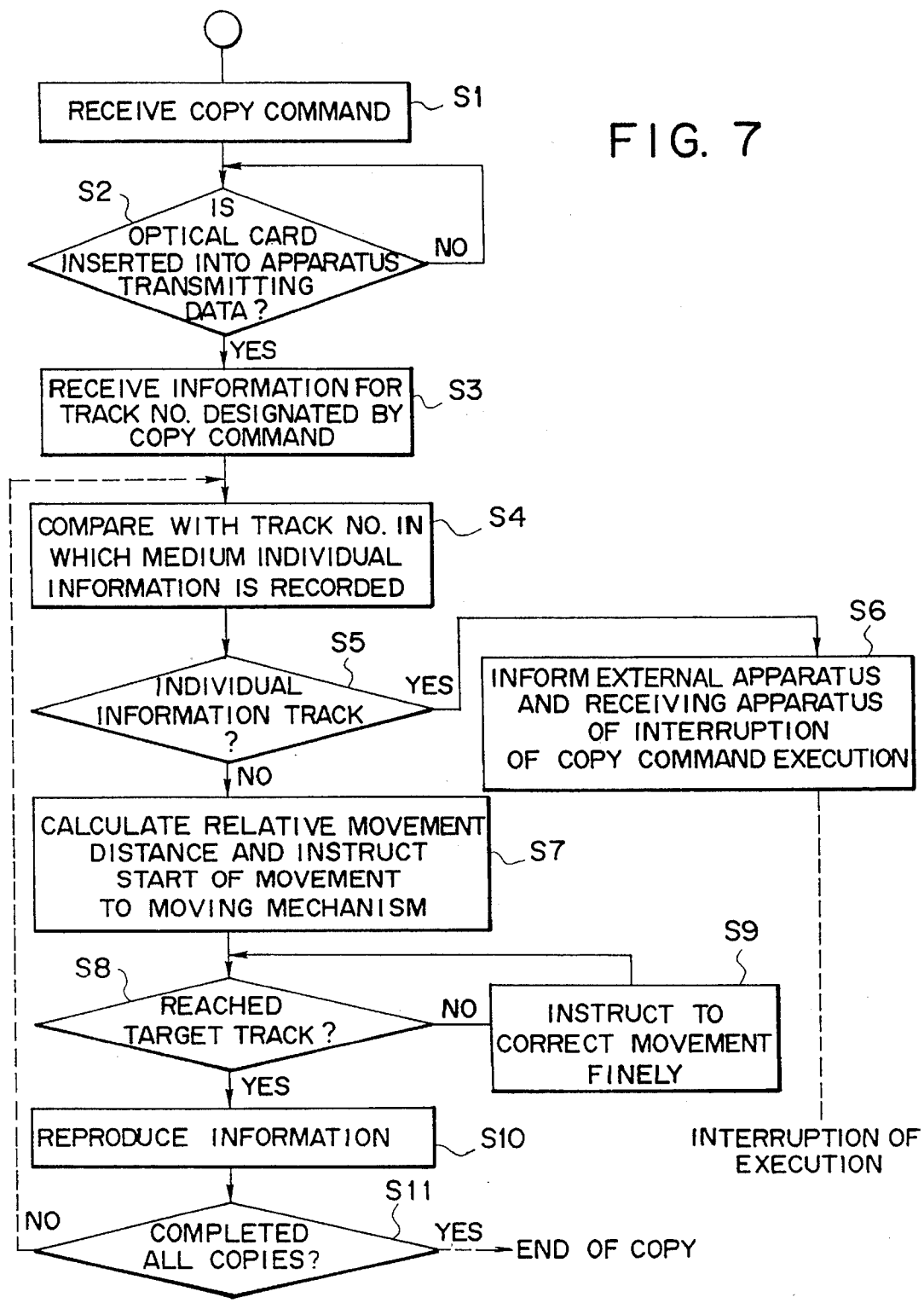
FIG. 7 is a flow chart for explaining another method of copying information using the system in FIG. 5 according to the present invention.

FIG. 7 is a flow chart showing another processing for preventing copy. Steps S1 to S3 in FIG. 7 are the same as those in FIG. 6, and a detailed description thereof will be omitted. Referring to FIG. 7, when the processor 21 receives a target information track or sector (S3), the processor 21 compares this position information with position information representing an information track or sector on which medium individual information is recorded (S4). The processor 21 then determines the comparison result (S5). If a coincidence is established, the processor 21 inhibits output of a moving instruction to the optical head moving control unit 24 and informs the external apparatus 10 of copying impossibility and access impossibility. The processor 21 also informs the optical card recording/reproducing apparatus 40 serving as the receiving apparatus of interruption of copy command execution (S6). If NO in step S5, the processor 21 determines this operation as a normal copy operation. The processor 21 controls the respective constituent components to reproduce information of, e.g., one track and transfers the reproduced data to the optical card recording/reproducing apparatus 40 serving as the receiving apparatus (S7 to S10). In the receiving apparatus, the reproduced data is recorded at the designated position of the optical card to execute copying. The processor 21 determines whether all designated data are copied (S11). If NO in step S11, steps S4 to S10 are repeated to complete all copies. In this routine, when the copy region coincides with the medium individual information region, the optical head is not moved to the reproduction position to inhibit the reproduction operation. Therefore, the medium individual information can be properly prevented from being copied, as in the routine of FIG. 6.

In the above embodiment described with reference to FIGS. 5 to 7, the medium individual information is recorded on one information track. However, this information may be recorded on a plurality of continuous information tracks or sectors or a plurality of discrete information tracks or sectors. In this case, all information tracks or sectors designated by the external apparatus are compared with the information track or sector on which the medium individual information is recorded, thereby posing no problem.

In the above embodiment, in the normal information recording and reproduction modes, an optical card recording/reproducing apparatus reads medium individual information from an optical card in advance, compares the read information with prestored information or information supplied from the external apparatus, and informs the external apparatus of a usable state of the optical card upon coincidence.

In the above embodiment, the following functions can be preferably performed in the same manner as described above by a BIOS (Basic I/O Subroutine) program installed in the external apparatus 10.

Function 1: An information track or sector on which medium individual information is recorded is read.

Function 2: When medium individual information is read, and recorded information is detected, the operation of the function continues.

Function 3: When the medium individual information is not recorded or is different, execution of recording and reproduction is interrupted.

As has been described above, according to the present invention, a recording or reproduction access to a predetermined region on a recording medium is inhibited, and information in the predetermined region on the recording medium can be properly prevented from being copied, thereby improving reliability associated with information security of the recording medium. When data copy is to be performed by exchanging the data of a recording medium in another information recording/reproducing apparatus, a copy access to a predetermined region is inhibited, and information in the predetermined region can be properly prevented from being copied.

The processing programs described with reference to FIGS. 3, 4, 6, and 7 are stored in a memory incorporated in the processor 21. A track address representing a track on which medium individual information is recorded is also stored in a memory in advance. The processor 21 performs various processing operations described above in accordance with the programs stored in the memory.

The present invention is not limited to the particular embodiments described above, but is applicable to a variety of applications. For example, the present invention is not limited to an optical information recording/reproducing apparatus, but is equally applicable to an information processing apparatus such as a magnetic recording/reproducing apparatus based on a principle other than the optical principle. The shape of the recording medium is not limited to a card-like shape, but can be extended to any shape such as a disk-like shape and a tape-like shape. Various changes and modifications may be incorporated in the present invention without departing from the scope of the appended claims.

What is claimed is:

1. A method of copying information recorded on a first recording medium to a second recording medium, using a first information processing apparatus for reproducing information from the first recording medium having information regions consisting of a specific region and a remaining region, a second information processing apparatus, connected to the first information processing apparatus, for recording the information reproduced by the first information processing apparatus on the second recording medium, and an external apparatus connected to the first and second information processing apparatuses, comprising the steps of:

sending a signal for designating a portion of the information regions of the first recording medium from the external apparatus to the first information processing apparatus;

determining by the first information processing apparatus whether the designated portion of the information regions falls within the specific region or remaining region;

inhibiting a copy operation of the information from the first recording medium to the second recording medium if the designated portion of the information regions is determined to fall within the specific region; and reproducing the information recorded on the designated portion of the information regions by the first information processing apparatus and recording the reproduced information on the second recording medium by the second information processing apparatus if the designated portion of the information regions is determined to fall within the remaining region.

2. A method according to claim 1, wherein each of the specific and remaining regions comprises at least one track assigned with an address, and the external apparatus sends a signal representing an address of a designated track to the first information processing apparatus.

3. A method according to claim 2, wherein the determining step comprises the step of comparing an address of a track designated by the external apparatus with an address of a track of the specific region.

4. A method according to claim 3, wherein the first information processing apparatus comprises a recording or reproducing head and means for accessing the head to a designated track, and further comprising the step of inhibiting access of the head when the address of the track designated by the external apparatus coincides with the address of the track of the specific region as a result of comparison.

5. A method according to claim 1, wherein the first information processing apparatus comprises means for transferring the reproduced information to the second information processing apparatus, and further comprising the step of inhibiting the transfer when the designated portion of the information regions is determined to fall within the specific region.

6. A method according to claim 1, wherein the specific region of the recording medium is recorded with individual information of the recording medium in advance.

7. A method according to claim 1, further comprising the step of sending a signal representing copying impossibility from the first information processing apparatus to the second information processing apparatus when the designated portion of the information regions is determined to fall within the specific region.

8. An information processing system comprising:
  a first information processing apparatus for reproducing information from a first recording medium having information regions consisting of a specific region and a remaining region;
  a second information processing apparatus, connected to said first information processing apparatus, for recording the information reproduced by said first information processing apparatus on a second recording medium;
  an external apparatus, connected to said first and second information processing apparatuses, for sending a signal for designating a portion of the information regions of said first recording medium to said first information processing apparatus; and
  control means for determining whether the portion of the information regions which is designated by the signal sent from said external apparatus falls within the specific or remaining region, for inhibiting information reproduction form the first recording medium if the designated portion of the information regions is determined to fall within the specific region, and for causing said first information processing apparatus to reproduce the information recorded on the designated portion of the information regions if the designated portion of the information regions is determined to fall within the remaining region.

9. An apparatus according to claim 8, wherein each of the specific and remaining regions comprises at least one track assigned with an address, and said external apparatus sends a signal representing an address of a designated track to said information processing apparatus.

10. An apparatus according to claim 9, wherein said control means comprises means for comparing an address of a track designated by said external apparatus with an address of a track of the specific region.

11. An apparatus according to claim 10, wherein said first information processing apparatus comprises a recording or reproducing head and means for accessing said head to a designated track, and said control means inhibits access of said head when the address of the track designated by said external apparatus coincides with the address of the track of the specific region as a result of comparison.

12. An apparatus according to claim 8, wherein said first information processing apparatus comprises means for transferring information reproduced from said first recording medium to said second information processing apparatus, and said control means inhibits the transfer when the designated portion of the information regions is determined to fall within the specific region.

13. An apparatus according to claim 8, wherein said control means comprises a microprocessing unit incorporated in said first information processing apparatus.

14. An apparatus according to claim 8, wherein the specific region of said first recording medium is recorded with individual information of said first recording medium in advance.

* * * * *

UNITED STATES PATENT AND TRADEMARK OFFICE
CERTIFICATE OF CORRECTION

PATENT NO. : 5,461,220
DATED : October 24, 1995
INVENTOR(S) : Yasuo OGINO

It is certified that error appears in the above-indentified patent and that said Letters Patent is hereby corrected as shown below:

ON THE COVER PAGE:

UNDER "FOREIGN PATENT DOCUMENTS":

```
"1237782   9/1989   Japan
 235187    9/1990   Japan
 3122713   5/1991   Japan
 3147193   6/1991   Japan"   should read --1-237782  9/1989  Japan
  2-235187  9/1990  Japan
  3-122713  5/1991  Japan
  3-147193  6/1991  Japan--
```

COLUMN 11:

Line 8, "copy" should read --copying--.

UNITED STATES PATENT AND TRADEMARK OFFICE
CERTIFICATE OF CORRECTION

PATENT NO. : 5,461,220

DATED : October 24, 1995

INVENTOR(S) : Yasuo OGINO

It is certified that error appears in the above-indentified patent and that said Letters Patent is hereby corrected as shown below:

COLUMN 14:

Line 5, "form" should read --from--.

Signed and Sealed this

Second Day of April, 1996

*Attest:*

BRUCE LEHMAN

*Attesting Officer*     *Commissioner of Patents and Trademarks*